Sept. 4, 1934.   W. T. GASSAWAY ET AL   1,972,650
REMOVABLE VALVE GUIDE
Filed Feb. 20, 1934
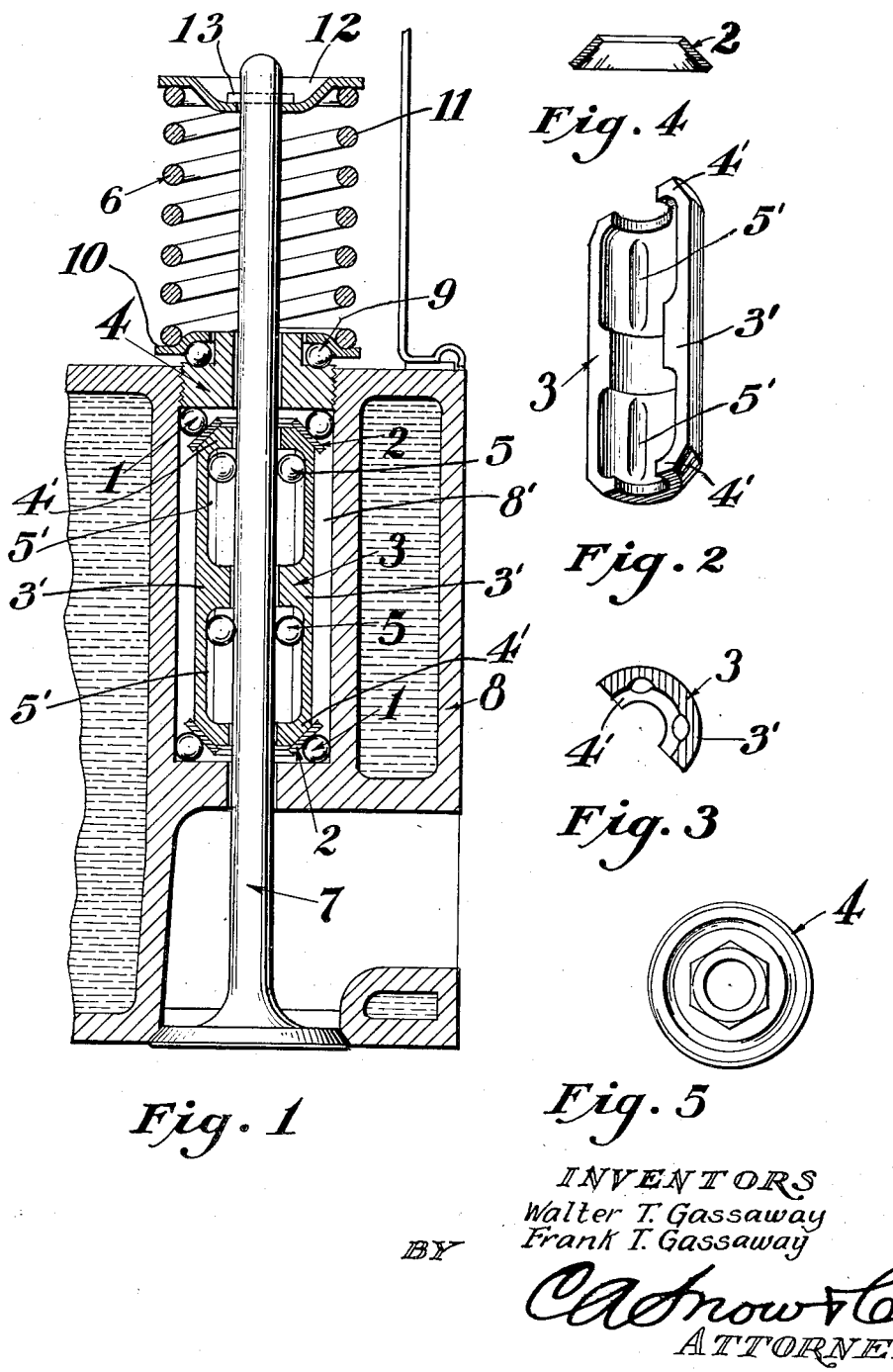
INVENTORS
Walter T. Gassaway
Frank T. Gassaway
BY
CA Snow & Co.
ATTORNEYS

UNITED STATES PATENT OFFICE 1,972,650

REMOVABLE VALVE GUIDE

Walter T. Gassaway and Frank T. Gassaway, Sacramento, Calif.

Application February 20, 1934, Serial No. 712,233

8 Claims. (Cl. 123—188)

This invention relates to poppet-valves designed primarily for use in connection with internal combustion engines.

The primary object of the invention is to provide means for mounting poppet-valves wherein the valves will have free vertical movement at all times, thereby eliminating what is commonly known as sticking valves.

Another object of the invention is to provide means to promote valve rotation, thereby providing a self-cleaning valve, and reducing carbon deposits on the valve and valve seat to a minimum.

A further object of the invention is the provision of an anti-friction guide for poppet-valves, which may be readily removed and cleaned, or repaired without the necessity of dismantling the entire engine head construction.

With the foregoing and other objects in view, which will appear as the description proceeds, the invention resides in the combination and arrangement of parts and in the details of construction hereinafter described and claimed, it being understood that changes in the precise embodiment of the invention may be made within the scope of what is claimed without departing from the spirit of the invention.

Referring to the drawing:

Figure 1 is a fragmental sectional view through an internal combustion engine head, illustrating a poppet valve and guide member.

Figure 2 is a perspective view of one of the sections of the guide member.

Figure 3 is a transverse sectional view through one of the sections.

Figure 4 is a sectional view through one of the dished washers employed in securing the sections of the guide member together.

Figure 5 is a plan view of the bearing member that closes the upper end of the enlarged bore in which the guide member is positioned.

Referring to the drawing in detail, the reference character 8 designates the head of an internal combustion engine wherein overhead valves are used, and although several valves of this type are employed in engine construction, and because all of the valves are identical, only one valve has been shown in the drawing, and only one valve will be described.

The head 8 is formed with an enlarged bore 8' providing a bearing at its lower end, the bore constituting a compartment in which the valve guide, forming the subject matter of this invention, is positioned. The valve guide is indicated generally by the reference character 3 and embodies sections 3' that have their ends extended inwardly at 4', so that when the sections are positioned within the enlarged bore, openings will be provided at the ends of the bearing member, through which the valve stem 7 of the poppet-valve extends. Grooves or raceways 5' are formed in the sections of the valve guides, and accommodate the ball bearings 5, which ball bearings move throughout the lengths of the grooves or raceways, when the valve 7 is in operation.

In order that the valve guide sections will be held in proper relation with respect to each other and with respect to the valve stem operating therethrough, retaining washers 2 are provided, which washers are dished so that they fit over the inturned ends of the sections, as clearly shown by Figure 1 of the drawing.

These washers 2 also provide bearings for the ball bearings 1 that are disposed at the ends of the removable guide members, so that the guide members may rotate freely within the enlarged bore, whereby the valve may rotate freely changing its position with respect to its seat, and thereby cleaning or removing carbon from the valve and its seat, insuring a true operation of the valve at all times.

The upper end of the enlarged bore 8' is internally threaded to receive the bearing member 4 that contacts with the ball bearings 1 at the upper end of the valve guide member, thereby holding the valve guide member in position at all times.

The upper portion of the member 4 is cut out and provided with a groove to accommodate the balls 9 that engage the washer 10 of the spring assembly, the washer 10 providing a seat for the spring 11 that has its upper end engaging the washer 12 that is held in position by means of the key 13 that is connected with the valve stem.

From the foregoing it will be obvious that due to the construction shown and described, the poppet valves supplied with antifriction guides, constructed in accordance with the invention, will have a free vertical movement and will at the same time be permitted to rotate freely, dislodging any carbon that may collect on the valves or valve seats.

Having thus described the invention, what is claimed is:

1. The combination with a poppet-valve of an internal combustion engine, a stem therefor, of a guide member through which the valve stem operates, said guide member comprising removable vertical sections, removable members at the ends of the sections securing the sections together, balls disposed within the guide members and engaging the valve stem, and ball bearings mounted at the ends of the guide member and on which the valve and valve stem rotates.

2. The combination with a poppet-valve having a stem and the valve guide opening, of a valve guide member embodying separable sections fitted in the guide opening, said sections having tapered upper and lower ends, dished washers fitted over the tapered upper and lower ends of the separable sections, holding the sections together, balls fitted within the valve guide member and engaging the stem of the valve, and balls providing bearings at the ends of the bearing members, and adjustable means for securing the guide member in its active position.

3. The combination with a poppet-valve having a stem operating in a valve opening of an internal combustion engine, of a removable valve guide member embodying sections, said sections having openings in which ball bearings are held, the ball bearings adapted to engage the valve stem, and ball bearings at the ends of the valve guide permitting free rotary movement of the valve guide member.

4. The combination with a poppet-valve having a stem and opening in which the poppet-valve stem operates, of a valve guide member embodying sections formed with cut out portions in which ball bearings are mounted and engaging the poppet-valve stem, and means for supporting ball bearings at the ends of the guide member.

5. The combination with a poppet-valve operating in a valve guide opening, of a guide member comprising vertical sections, ball bearings mounted within the guide member and engaging a valve stem associated therewith and reducing friction between the valve stem and its guide, ball bearings mounted at the ends of the guide member, and means for adjusting the ball bearings.

6. A removable guide for a poppet valve stem of an internal combustion engine, comprising hollow sections, ball bearings mounted within the guide and engaging a valve stem associated therewith, bearing members fitted over the ends of the sections holding the sections together, ball bearings engaging the bearing members and on which the valve guide rotates, and means for securing the valve guide in position.

7. A removable valve guide for poppet-valves, comprising a hollow body portion having curved ends, a valve stem operating through the guide balls fitted in the curved ends and engaging the valve stem and ball bearings at the ends of the body portion and disposed exteriorly of the body portion, the last mentioned balls providing supports for the guide.

8. A removable guide for poppet-valves, comprising a pair of semi-tubular sections, dished washers positioned over the ends of the semi-tubular sections and adapted to hold the sections together, a valve having a stem operating through said guide ball bearings within the valve guide and adapted to engage the valve stem, ball bearings at the ends of the guide member, and said dished washers providing bearings for the balls at the ends of the guide.

WALTER T. GASSAWAY.
FRANK T. GASSAWAY.